United States Patent [19] [11] Patent Number: 4,838,523
Humble et al. [45] Date of Patent: Jun. 13, 1989

[54] ENERGY ABSORBING GUARD RAIL TERMINAL

[75] Inventors: Walter P. Humble; John C. Durkos; Nick A. DiMargio, all of Canfield; Dominick J. Cortell, Youngstown; Charles W. Syak, Girard, all of Ohio

[73] Assignee: Syro Steel Company, Girard, Ohio

[21] Appl. No.: 223,926

[22] Filed: Jul. 25, 1988

[51] Int. Cl.$^4$ .............................................. A01K 3/00
[52] U.S. Cl. ..................................... 256/13.1; 248/66; 403/2
[58] Field of Search ..................... 256/13.1, 19; 403/2; 248/66

[56] References Cited

U.S. PATENT DOCUMENTS

| | | | |
|---|---|---|---|
| 4,222,552 | 9/1980 | Matteo | 256/13.1 |
| 4,330,106 | 5/1982 | Chisholm | 256/19 X |
| 4,452,431 | 6/1984 | Stephens et al. | 256/13.1 |
| 4,655,434 | 4/1987 | Broustad | 256/13.1 |

Primary Examiner—Andrew V. Kundrat
Attorney, Agent, or Firm—Harpman & Harpman

[57] ABSTRACT

An improvement to an energy absorbing guard rail terminal for use on longitudinally extending roadways. The energy absorbing guard rail terminal having a number of overlapping horizontally extending parallel guard rails positioned on oppositely disposed sides of a plurality of longitudinally spaced break away posts with the upstream ends of the guard rails secured to the post. Splice bolts connect the overlapping ends of adjacent rails which are characterized by a plurality of openings within each horizontal rail aligned with the splice bolts whereby the impact of the vehicle on the upstream end of the rails will force the bolts to shred out the rail material between the openings within the rails. By absorbing the kinetic energy of the impacting vehicle, the collapseable guard rail terminal allows for safe deceleration of the vehicle upon impact, avoiding serious injury to the driver.

5 Claims, 2 Drawing Sheets

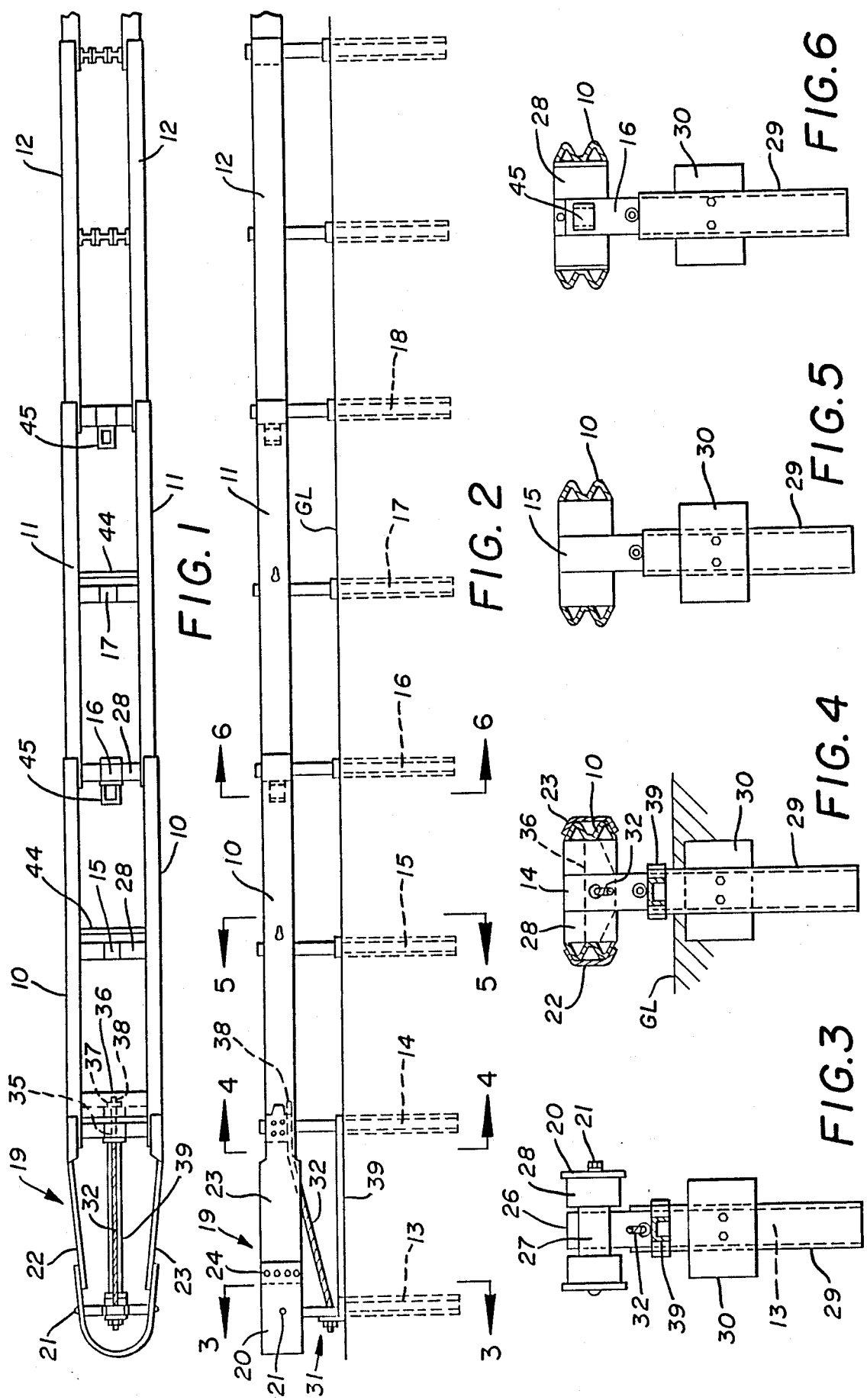

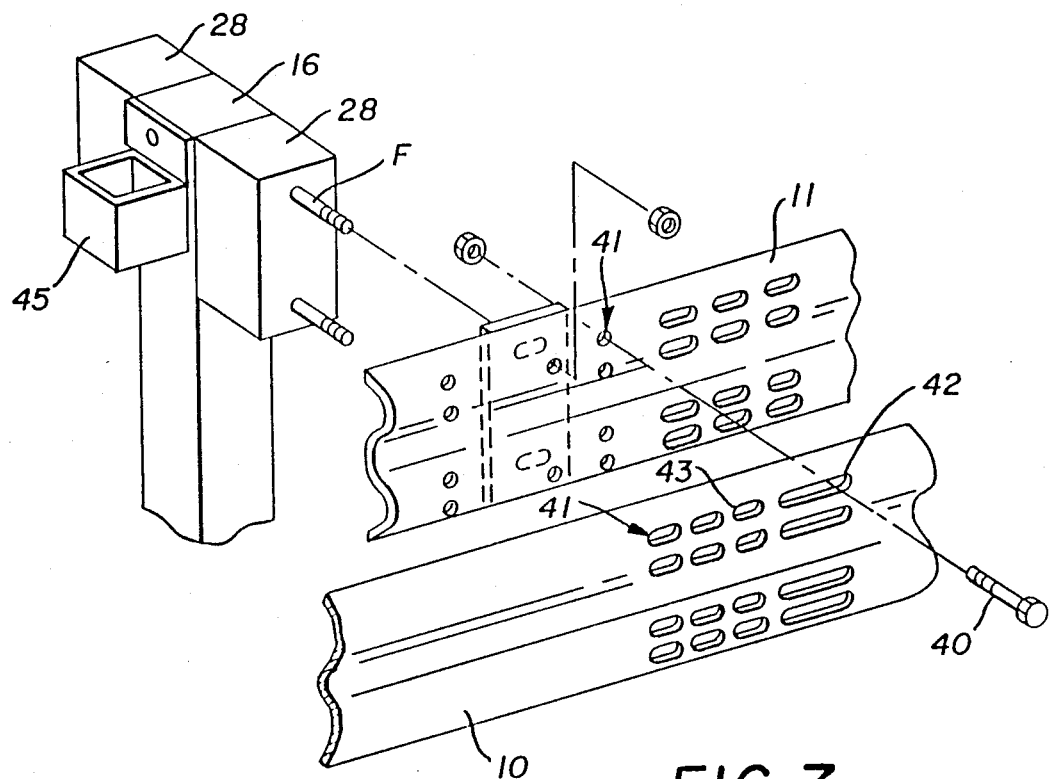
FIG. 7
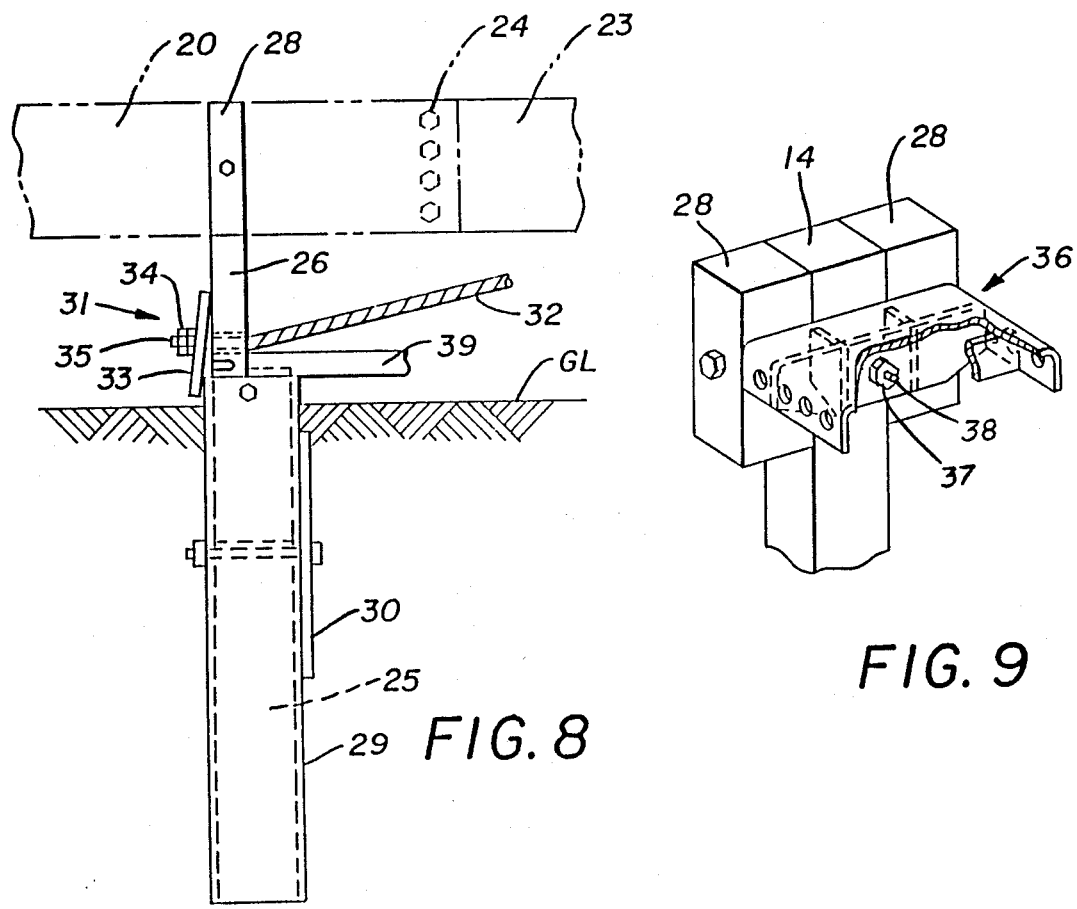
FIG. 8
FIG. 9

ENERGY ABSORBING GUARD RAIL TERMINAL

BACKGROUND OF THE INVENTION

1. Technical Field

This invention relates to energy absorbing guard rail terminals of the type which are used along the roadside and in the median between limited access highways to deflect vehicles from hazards which can be associated behind the barriers. Guard rails are typically defined of a W-shaped configuration mounted on a plurality of spaced posts so as to function primarily in tension when redirecting the impact of the vehicles.

2. Description of Prior Art

Prior Art devices of this type have relied on a variety of different structural configurations design to redirect, reflect and to absorb the kinetic energy of the vehicle upon impact, see for example U.S. Pat. No. 4,655,434, U.S. Pat. No. 4,452,431, U.S. Pat. No. 4,678,166 and U.S. Pat. No. 4,330,106.

In U.S. Pat. No. 4,655,434 an absorbing guard rail terminal is disclosed in which applicant's invention is an improvement thereon.

In U.S. Pat. No. 4,452,431 a restorable fender panel is disclosed wherein a reusable impact attenuation device is provided to collapse under the impact of a vehicle in protecting stationery structures from damage.

Buffer elements are interposed between the diaphram panel members, thus absorbing the kinetic energy of the vehicle as the successive buffer elements are compressed therebetween.

In U.S. Pat. No. 4,678,166 an eccentric loader guard rail terminal is disclosed for use at the upstream end of a conventional guard rail utilizing a plurality of joined together horizontally extending W-beam guard rails. The device is devised so as to utilize an eccentric lever means whereby as the impacting vehicle at the upstream end will facilitate buckling of the rails allowing the vehicle to pass behind the terminal preventing possible roll over or other destabilizing features associated with vehicle impact on a barrier.

In U.S. Pat. No. 4,330,106 a guard rail construction is disclosed which utilizes a plurality of overlapping guard rail sections with each of the rail elements attached to the adjoining or overlapping section by a bolt so that upon actual impact the rail sections will move axially with respect to one another, but remain in full tensile strength and thus maintaining their redirectional characteristics.

Development of terminal designs is complicated by the need to minimize resistance for small car impacts while still providing the necessary strength for full size car impacts either on the end or downstream of the approach end.

The present invention is directed to improvements to an energy absorbing guard rail terminal which functions essentially as a crash cushion providing a series of spaced opening which are in line with splice bolts when two beams are overlapped. This provides an energy absorbing mechanism as the rails are telescoped relative to each other by the splice bolts shredding out the metal strips between the openings. The shredding of the material provides a uniform and controlled energy absorbtion mechanism. In addition the sections of the guard rails are staggered so that the upstream section will telescope first so as to minimize resistance for the small car impacts while still providing strength necessary to absorb full size car impacts.

SUMMARY OF THE INVENTION

An improvement to an energy absorbing guard rail terminal utilizing oppositely disposed overlapping guard rail sections on break away posts which will effectively absorb and dissipate the kinetic energy of a vehicle upon impact. The improvement is directed towards the improved break away post characteristics and initial resistance encountered in the telescopic collapsing action of the overlapping energy absorbing rail sections.

DESCRIPTION OF THE DRAWINGS

FIG. 1 is a top plan view of the energy absorbing rail terminal of the present invention;

FIG. 2 is a side elevational view of the structure of FIG. 1;

FIG. 3 is a cross-sectional view taken along lines 3—3 of FIG. 2;

FIG. 4 is a cross-sectional view taken along lines 4—4 of FIG. 2;

FIG. 5 is a cross-sectional view taken along lines 5—5 of FIG. 2;

FIG. 6 is a cross-sectional view taken along lines 6—6 of FIG. 2;

FIG. 7 is an enlarged perspective view of a portion of the guard rail terminal showing the overlapping rail portions and attachment to a break away post;

FIG. 8 is a side elevational view of the nose portion and associated post support; and FIG. 9 is a perspective view of an enlarged portion of the guard rail terminal.

DESCRIPTION OF THE PREFERRED EMBODIMENT

An improvement to an energy absorbing guard rail terminal as illustrated in U.S. Pat. No. 4,655,434 wherein the terminal comprises multiple pairs of oppositely disposed horizontally extending guard rails 10, 11 and 12 having overlapping ends supported from a plurality of longitudinally spaced vertical break away wooden posts 13 through 18. The guard rail pairs may be of any suitable metal, but preferably are of a conventional W-beam rail configuration.

An impact nose section 19 can best be seen in FIGS. 1, 2, and 3 of the drawings at the upstream vehicle approach end of the terminal. The nose section 19 comprises a three-part wrap around construction with a curved end piece 20 secured to the post 13 by a fastener 21. Oppositely disposed nose panels 22 and 23 overlap and are secured to the free ends of the curved end piece 20 by a plurality of fasteners 24. The remaining ends of the nose panels 22 and 23 are secured in overlapping relationship to the respective ends of the guard rail pairs 10 and the post 14, as best seen in FIG. 4 of the drawings.

The post 13 to which the nose curved piece 20 is secured is comprised of a main body member 25 which is notched inwardly of its upstanding free end at 26 reducing the effective cross-sectional dimension of the post at the notch by approximately one-half. A metal support sleeve 27 is positioned on the post inwardly from the free end of said post, acting as a reinforcement and spacer for a pair of wooden spacer blocks 28 secured to the support sleeve 27 and the post 13 by the fastener 21. Each of the posts 13-18 is positioned within a metal post tube 29 with a soil anchor plate 30 secured to the post and post tube below ground level GL. A cable assembly 31, best seen in FIGS. 1, 2, and 8 of the drawings has a steel cable 32 extending through an aperture in the notch portion of the post 13 with apertured retainer plate 33 positioned on the upstream side of the post 13 resting on the steel post tube 29 on the post main body member 25 and notch portion. Fastening nuts 34 are threadably engaged on a stud S swagged to the end of the cable 32 restricting cable movement through the post. The other end of the cable 32 extends through an aperture in the post 14 at 35 and a spacer channel 36 that extends between the guard rails 10 abutting the post assembly 14 as seen in FIGS. 1, 2, and 9 of the drawings. A pair of nuts 37 are threadably secured to the end of a stud 38 swage connected to the end of the cable 32 as is well known in the art. A post connection strut 39 extends between the posts 13 and 14 just above the terminal end of steel post tubes 29 and just below the cable 32 on the post 13 only.

The cable assembly 31 defines an improved load path during impact. The connection strut 39 interconnects the respective posts 13 and 14. The notch post 13 will break away upon impact while the cable assembly anchored to the post 13 will act as a dead man anchor for the cable 32 and its attached post 14 and spacer channel 36 as best seen in FIGS. 1, 4, and 9 of the drawings. The cable assembly 31 also improves the divergent angle of attack implied by angular impact on the rails 10, 11, and 12 when the guard rail terminal is utilized as a medium barrier in certain applications.

The overlapping ends of the guard rail pairs 10, 11, and 12 are secured to one another via shearing bolts 40. Slot configurations 41 illustrated in FIG. 7 of the drawings provide energy absorbing shredding of the metal strips between a series of openings or slots in the guard rails upon impact. The slot configurations 41 are characterized by the first engagement slot 42 in the rail 10 being of a substantially greater length than the next engageable slot 43 so that during impact as the rails 10 telescope over the rails 11 the initial movement will be less restrictive providing a slight timing delay before shredding begins. It will be seen that only the upstream ends of each guard rail pairs are secured to the respective posts by fasteners extending through the spacer blocks 28 and posts providing the stabilization for the upstream rail ends for proper telescopic and shredding to occur.

It is critical that as the first set of guard rails 10 telescope over the second set of rails 11 that the second rails 11 remain secured to their respective posts to insure that the shredding action takes place and energy absorbtion of the shearing is utilized. Once the impact movement has fully engaged the first set of rails 10 and the intermediate post 15 breaks away, then the post 16 breaks away and the second rail set 11 telescopes by shredding as hereinbefore described against the rail set 12 secured at its respective upstream end to the post 18. The kinetic energy generated by the impact vehicle (not shown) is thus dissipated by the successive energy absorbing nature of the nose piece, rail configuration and break away posts.

Preferably the upstream rails 10 may be of a smaller gage metal than the downstream or falling rails 11 for proper performance.

Referring back to FIG. 1 of the drawings, connecting rods 44 will be seen extending transversely between the respective rail pairs 10 and 11 adjacent posts 15 and 17 only. Each of the rods 44 is fastened to the rail pairs via a keyhole opening in the rail.

Downstream from each connecting rod 44 a box beam 45 is mounted on the upstream side of each posts 16 and 18 respectively. Each of the box beams engages, bends and releases the rod 44 upon impact as the rail pairs 10 and 11 telescope down over one another as hereinbefore described.

Referring now to FIG. 7 of the drawings and the slot configurations 41, it will be seen that the spacing between said next engageable slot 43 can be progressively increased thereby gradually increasing the relative energy needed to shred the space material between the slots 43 thus proportionally dissipating the kinetic energy of the vehicle during impact. The progressive increase in spacing can be varied as well as the duration of the progressive increase so as to match the desired energy absorbtion effect required during selected vehicle impact.

It is evident from the above description that it is important to utilize the combination of all the elements, that is the break away posts, the telescopic rail and the shredding effect between the rail pairs and the nose piece collapse and associated cable assembly to dissipate the kinetic energy and to provide a proper energy absorbing terminal as required. The connecting rods, mentioned above, maintain the rails parallel to one another during the initial telescopic action, but is removed upon impact with the next succeeding post having the box beam 45 secured thereto. This action allows for smooth transition of the telescopic rail sections pass the next adjacent break away post, thus instituting a further telescopic and shredding configuration as described. The improvements to the energy absorbing terminal as described in U.S. Pat. No. 4,655,434 are characterized by changing the slots for the shearing bolts 40, decrease overall dimension of the first break away post 13 thus, eliminating the tendency of a full width break away post to act as a launching ramp tending to overturn the impacting vehicle. By reducing the depth of the post by utilization of the notch, the potential for its use as a launching ramp critical to vehicle and thus occupant survival is dramatically reduced. The notch portion above ground level and the positioning of the cable 32 from the post 13 to the post 14 in combination with the fixed strut extending therebetween.

Therefore I claim:

1. An improvement to an energy absorbing guard rail terminal, the terminal comprises a plurality of pairs of transversely spaced parallel horizontally extending guard rails having overlapping ends, a plurality of break away support posts supporting said guard rails, mounting bolts securing the underlapping rails to said posts, spacer rods between said parallel rails and a box beam on some of said posts facing said spacer rods, multiple spaced openings in each of said guard rails aligned longitudinally for registration of the splice bolts therebetween, the improvement comprises a first break away post having a notch portion on its above ground portion, a cable and support assembly extending from said first post below a break away point, means for spacing said guard rail pairs on said support posts, means for decreased telescopic resistance between said underlapping rail ends and a three-piece nose assembly secured between said first post and said cable support assembly.

2. The improvement to an energy absorbing guard rail terminal of claim 1 wherein said cable support assembly comprises the cable extending through the notched portion of said first post, below said break away point, threaded studs secured on each of said cable ends, an apertured retainer plate positioned over one of said studs engaging said notch portion of said first post, fastening means securing said retainer plate on said stud, an apertured spacer channel secured between said first of said guard rail pairs and abutting said second of said post, said cable extending through said second post and said spacer channel and secured by fasteners thereon.

3. The improvement to an energy absorbing guard rail terminal of claim 1 wherein means for decreasing telescopic resistance between said overlapping guard rail pairs comprises enlarged first slot configurations registrable with said splice bolts for shredding material between said adjacent slots upon telescopic collapse of said overlapping guard rail pairs dissipating kinetic energy as sheared.

4. An improvement to an energy absorbing guard rail terminal, the terminal comprising a plurality of pairs of transversely spaced parallel horizontally extending guard rails having overlapping ends, a plurality of break away support posts supporting said guard rails, mounting bolts securing the underlapping rails to said posts, spacer rods between said parallel rails and a box beam on some of said posts facing said spacer rods, for engagement with said spacer rods during impact, multiple spaced openings in each of said rails aligned longitudinally for registration of shearing bolts therebetween, the improvement comprises a first break away post having a notch portion on its above ground portion, a cable and support assembly extending from said first post below a break away point of said first post, means for spacing said guard rail pairs on said support posts, means for progressively increased telescopic resistance between said underlapping rail ends and a three-piece nose assembly secured between said first post and said cable support assembly.

5. The improvement to an energy absorbing guard rail terminal of claim 4 wherein said means for increased telescopic resistance between said underlapping rail ends comprises engageable slots progressively spaced longitudinally of one another for increased spacing material between the slots.

* * * * *